July 5, 1932.  W. L. DE BAUFRE  1,866,399
CONTINUOUS PROCESS FOR PRODUCING HIGH HEATING VALUE GAS
Filed July 9, 1927  2 Sheets-Sheet 1
Fig:1.
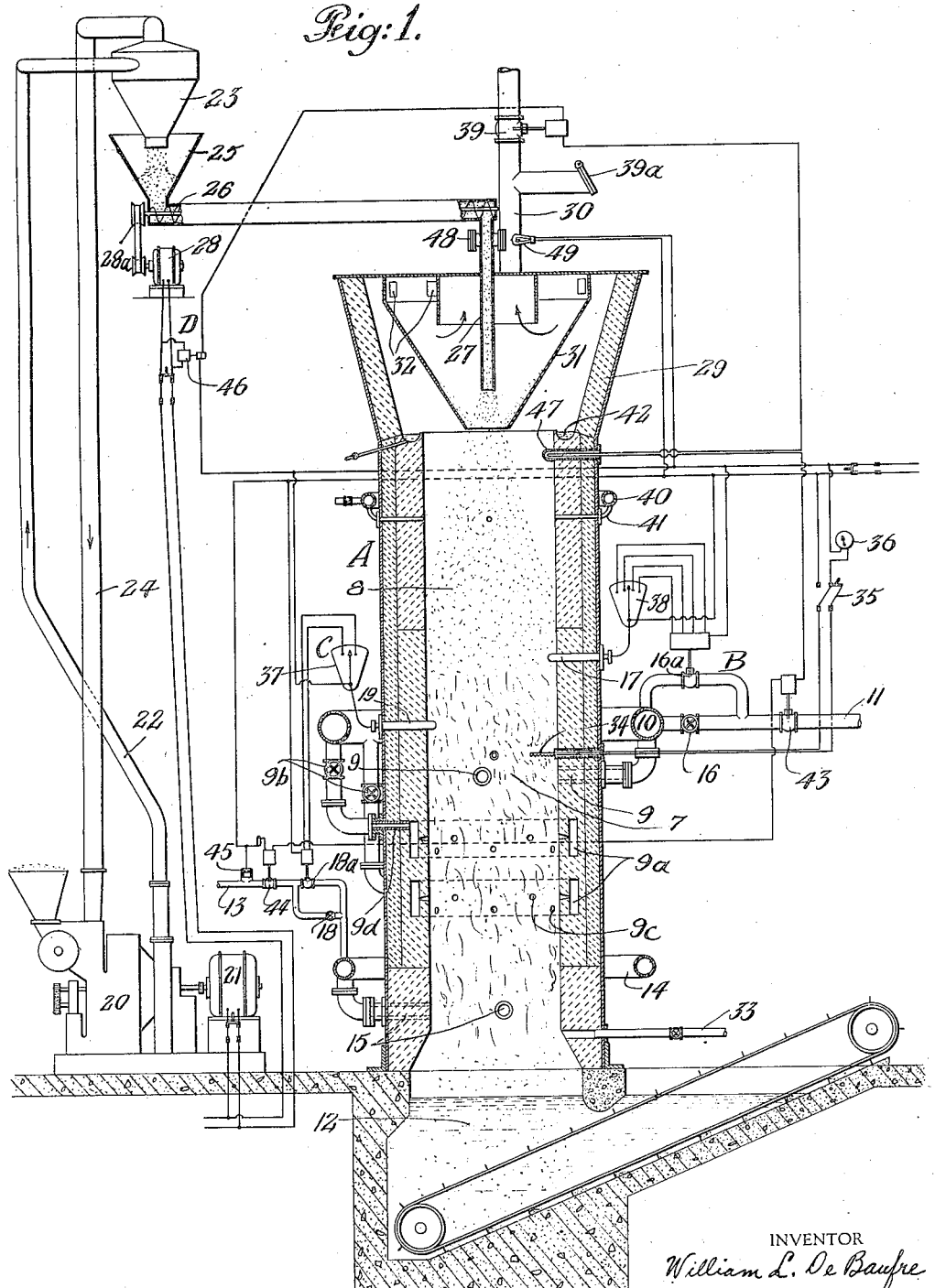
INVENTOR
William L. De Baufre
BY
Synnestvedt & Lechner
ATTORNEYS

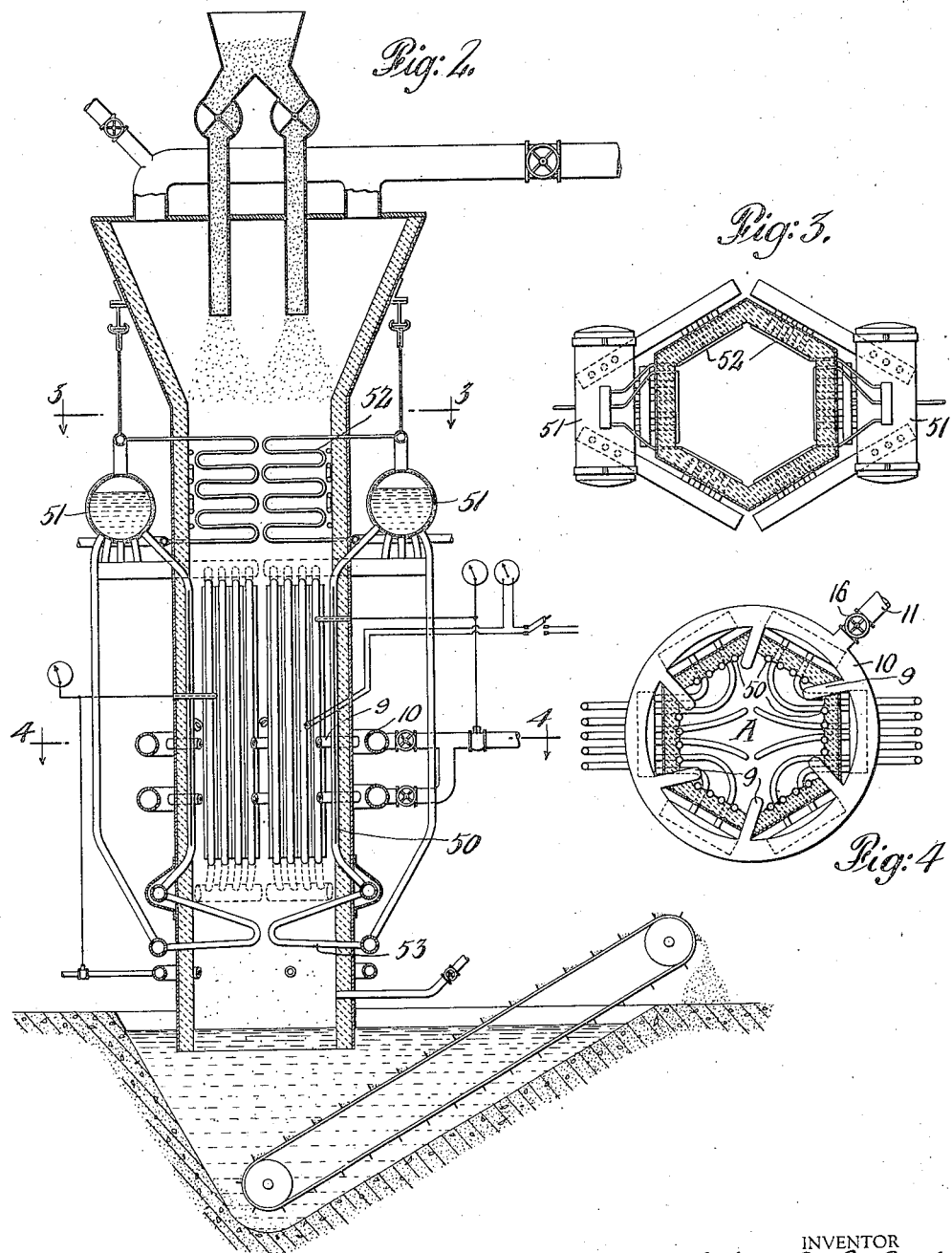

Patented July 5, 1932

1,866,399

UNITED STATES PATENT OFFICE

WILLIAM L. DE BAUFRE, OF NEW YORK, N. Y.

CONTINUOUS PROCESS FOR PRODUCING HIGH HEATING VALUE GAS

Application filed July 9, 1927. Serial No. 204,445.

This invention relates to the production of high heating value gas, and one of its primary objects is to provide a continuous process for producing such gas.

Heretofore two general processes have been employed, namely, the water gas process and the producer gas process. Essentially these processes differ in that water gas, as produced, is the product of the action on incandescent carbon of steam, while producer gas is the product of the action on fuel of a mixture of steam and atmospheric air. In the case of water gas, the reaction is endothermic and heat must be supplied, the cycle being divided into two periods. During the first or blasting period coke is heated by partial combustion with air, and, while coke is consumed, no marketable gas is produced. During the second period steam is blown through the carbon previously made incandescent by the heat developed during the blasting.

In the manufacture of producer gas two simultaneous reactions are employed—$2C + O_2 = 2CO$, and $C + H_2O = H_2 + CO$, the first of which is exothermic, and the second of which is endothermic. By a proper balancing of these reactions, the process, as a whole, is rendered slightly exothermic, and so becomes continuous.

In the water gas process the volume of gas per unit of carbon is low, whereas practically all of the carbon which is charged in the producer process appears in the gas, so that the volume of combustible gas is high per unit of carbon. The product of the producer gas process, however, is of low calorific value.

It is another object of my invention, therefore, to provide a process of high carbon efficiency producing high calorific value gas, i. e., a process which combines the advantages of the water gas and the producer gas processes, but which avoids their disadvantages.

More specific and detailed objects and advantages will appear in the following description of the best form of the invention now known to me.

How the foregoing is realized is illustrated in somewhat diagrammatic form in the accompanying drawings, wherein Fig. 1 is a vertical section through a retort and associated mechanism suitable for carrying out my invention.

Fig. 2 is a similar section of a form of apparatus for carrying out a modification of the invention, and Figs. 3 and 4 are sections on the lines 3—3 and 4—4 of Fig. 2.

In carrying out my invention I use a gas producer somewhat similar to that used for present gas manufacture, this producer being in the form of a shaft A, in which I cause the fuel to progress in one direction and the blast mixture to progress in a counter-direction. Instead of maintaining a bed of fuel through which the gaseous mixture is passed, I introduce the fuel in a finely divided condition at the top, so that it is partly suspended in the ascending gas stream and floats from the top to the bottom of the producer. As the fuel is admitted and comes in contact with the hot ascending gases, the initial distillation products are expelled and pass on with the gas. This distillation progresses as the fuel sinks down the shaft and through the zone of increasing temperature. After all volatile constitutents of the fuel have been distilled, the resulting carbon, still partly suspended in the gas stream, reaches a zone of reaction 7 below the zone of heating and distillation 8.

Carbon, on reaching the zone of reaction, is acted upon by oxygen and steam. I regulate the relative amounts of oxygen, inert gas and steam admitted so that sufficient heat is generated by the reactions to satisfy the thermal requirements of the process as a whole, and to produce in the reaction zone a gas consisting essentially of carbon monoxide and hydrogen or carbon monoxide, hydrogen and nitrogen.

The steam, as will further appear is preferably all admitted below the zone of reaction, and the ash which results from the consumption of the carbon in the reaction zone sinks downwardly through the steam in a finely divided condition. The ash loses a large percentage of its sensible heat, causing the steam to become superheated before reaching the zone of reaction. The transfer of heat between the ash and steam is advantageous in that it serves not only to superheat the steam, but also to cool the finely divided ash particles and prevent any objectionable degree of coalescence thereof, so that the ash deposits in the bottom of the producer in small particles without clinker formation.

The oxygen or oxygenated air for the blast is admitted substantially at the bottom of the reaction zone through the medium of a plurality of nozzles 9 with which the manifold 10 is provided, the manifold being supplied by a pipe 11 leading from a suitable source of supply. The amount of oxygen or oxygenated air which is supplied is regulated by hand or by the regulating mechanism B which will be further described. The nozzles 9 are preferably disposed so as to discharge tangentially to a circle, as indicated in Fig. 4, at a velocity such as to impart a swirling movement in the zone of reaction. I prefer that the velocity shall not be great enough to cause impingement on the shaft wall but sufficient to carry the oxygen or oxygenated air toward the center of the shaft before much combination with carbon takes place, in order to minimize the maximum temperature attained in the producer and also the temperature to which the refractories are subjected. Thus, while the quality of the gas produced as regards its carbon monoxide: carbon dioxide ratio is determined by the final temperature of the reaction zone, a somewhat higher initial reaction temperature may be reached due to the initial formation of carbon dioxide, which latter takes up more carbon to form carbon monoxide. The difference in temperature in the reaction zone should be very small, according to my process, due to the heat transfer by radiation between the points where carbon dioxide and carbon monoxide are formed, the equalization being further facilitated by the turbulence caused by the tangential jets of oxygen. By giving sufficient velocity to these jets the zone of carbon dioxide formation is forced to the center portion of the cross section and the walls are protected from radiation by the intervening clouds of fuel and gas particles. The whirling action set up persists up through regions above the reaction zone promoting uniformity. However, particles of fuel are thrown out by centrifugal force to the vicinity of the walls, and some of these particles pass by the oxygen jets entering the producer, and in order to supply oxygen for the gasification of these particles, oxygen is introduced at low velocity at a number of points around the circumference, for which purpose I provide the two annular ducts 9a in the shaft wall to which oxygen is supplied from the bustle pipe or manifold 10 under control of the valves 9b. A plurality of small ports 9c open from the ducts 9a into the shaft, none of these ports coming directly opposite the refractory tubes 9d, such as alundum tubes, which are employed to deliver oxygen to the ducts 9a. Tubes of such an oxide refractory material will not be destroyed as would metal tubes, and, furthermore, they have a lower heat conductivity, and, hence, a tube of comparatively short length may be used to reduce the temperature from that within the producer to a temperature but little above room temperature at the bustle pipe where the oxygen comes into contact with the metal.

The point of oxygen admission is placed sufficiently high above the bottom of the shaft to permit of the desired cooling of the ash particles, and the length of shaft above the point of oxygen admission is such as to secure an adequate zone for reaction and an adequate zone for heating and distillation.

In the arrangement shown in Fig. 1, the shaft is closed at the bottom by a water seal 12 which supplies part of the steam required, and which, if used, removes any difficulties in connection with the formation of clinker by the gravitating ash particles. The balance of the steam is preferably supplied to the shaft by means of the supply pipe 13, the bustle 14, and the nozzles 15, the amount of steam admitted by the pipe 13 being controlled by hand or automatically controlled by the mechanism C to be described. The manifold 14 is located near the bottom of the shaft, although it may be located higher up or steam may be supplied in part at or near the reaction zone, and in part well below the reaction zone, as indicated.

The steam rising to the reaction zone is also superheated by radiant heat from such zone, but, since steam is more or less impervious to penetration by radiant energy, the lower portion of the producer is protected from overheating which would otherwise result from such radiant energy, but which energy, in my process, is returned to the reaction zone by the rising superheated steam, whereby maximum thermal efficiency is ensured. In the absence of such an impervious blanket of steam, the ash might be slagged on the bottom, especially if a water seal were not employed.

The regulation of the oxygen and the steam supplies constitutes an important part of my invention, and, in the embodiment shown in Fig. 1, the oxygen supply is regulated by a hand valve 16 or by means of an automatic regulating valve 16a operatively associated with the thermostat device 17 located preferably just above the reaction zone. The steam supply is controlled by a hand valve 18 or automatically controlled by the automatic regulating valve 18a operatively associated with the thermostat device 19 preferably located midway of the height of the reaction zone.

As pointed out, the control afforded by my invention is an important feature. In the present producer gas process the temperature at the reaction zone is controlled, to a limited extent, only, by the relative amount of steam used. The control is limited only as will appear from the following. In order to be converted into hydrogen and carbon monoxide, steam must make intimate contact with the active surface of the carbon. When admitted to a fuel bed containing many large voids, as is the case in the present producer gas process, much of the steam passes up through the voids without direct contact, and escapes undecomposed in the gas. In passing through the fuel bed, the undecomposed steam is superheated and serves as a temperature reducer, but the heat so absorbed serves no useful purpose in the chemical reaction and constitutes a direct loss.

According to my process, I control the temperature of the reaction zone by the regulated use of steam, but in my process there are no voids through which steam may pass without contact with active carbon. There are voids in a sense to be sure, but with the carbon in a finely divided state and sinking gradually counter-current to the ascending gases, steam cannot pass without contact with active carbon, and the steam is, therefore, substantially wholly decomposed and the heat absorbed is converted into potential heat in the gas.

Also, in present practice, the dimensions of the reaction zone depend upon the rapidity with which blast oxygen is converted to carbon monoxide. This, as in the case of steam, depends upon the size and number of voids in the fuel bed, and cannot be controlled effectively. In my process the extent of the reaction zone depends upon the relative velocities of the ascending gas and descending carbon, and by changing the size or shape of the fuel particles, and, hence, their buoyancy, I am able to change the length of the reaction zone, such change being uniformly constant over the entire section. The reaction zone has such depth as practice may indicate as desirable for the particular fuel being treated.

The temperature of gas leaving a gas producer is very high, and is disadvantageous in that it involves an appreciable loss of heat, and in that the hydro-carbons, as they are expelled from the fuel, enter this high temperature gas stream and assume the prevailing temperature. The more complex hydrocarbons which are the most desirable, from a commercial standpoint, are not stable at high temperatures, but begin to decompose at 500° F., the ultimate decomposition products being carbon, hydrogen and carbon monoxide. The net result is that the more valuable gaseous constituents of the fuel do not enter the gas as such, and neither are they recovered as valuable by-products. They are almost totally decomposed, forming soot, hydrogen and carbon monoxide. Much of this decomposition might be prevented were it possible to increase the depth of the fuel bed to such an extent as to further cool the upwardly flowing gases. Even assuming it were possible to provide a bed of sufficient depth, the hydrocarbons from the interior of each lump of fuel will even then be expelled to an atmosphere much higher in temperature than that of their distillation. A high fuel bed would not only increase the pressure drop, but would also accentuate the unevenness of the combustion zone and the difficulties hereinbefore mentioned.

According to my process the transfer of heat will be greatly facilitated by reason of the very great heat absorbing surface presented by the finely divided material in which heat conductivity exerts little influence. The pressure drop in my process is almost negligible, so that I am enabled to increase the time of contact of fuel and gas to any extent desirable without materially increasing pressure conditions or affecting the reaction zone. I, therefore, build my producer, particularly where coal is used, of such height as to produce a relatively cool gas in which a minimum amount of the hydrocarbons have been destroyed. I am thus enabled not only to manufacture a gas richer in combustibles by virtue of its hydrocarbon content, but also to obtain a larger quantity of the usual by-products of distillation, such as ammonia, benzol, napthalene, tar, etc.

The decreasing of the nitrogen in the blast by enriching the oxygen content to any desired value further accentuates the above effect, for, as the nitrogen is decreased, the volume of gas which acts as a conveyor of heat from the reaction zone to the distillation zone is decreased. In decreasing the nitrogen I am further concentrating the available heat in the reaction zone, so that I am enabled to produce more hydrogen by the decomposition of steam. I, therefore, convert a part of the sensible heat of the ascending gas which has a detrimental effect on the process as a whole, and which may not be subsequently recovered, into chemical energy which does not affect the fuel distillation, and which is recovered as thermal value in the gas.

The partial pressure of the condensible by-products is increased by the decrease in nitrogen content of the blast, and, hence, a greater recovery of said by-products is made possible by my process. The reduction of nitrogen in the blast not only reduces the amount of heat which is carried away from the reaction zone, but also ensures return to the reaction zone of the greater portion of the heat so carried away as sensible heat in the fuel.

The product of my process is a fuel gas superior to producer gas and may even exceed, in value, the so-called water gas, particularly where an oxygen or an oxygen enriched blast is employed.

Unlike the water gas process, my process is continuous and not intermittent, and practically all of the fuel charged is converted into salable gas.

During the period of gas making in the water gas process the temperature of the coke bed ranges from an initial value of from 2800° to 3000° F. to a lower limiting value of about 1800° F. It is known that the reactions proceed in more satisfactory manner at the higher temperature, and that the quality of the gas is decreased as the temperature is lowered. The composition of the gas in the water gas process constantly changes, starting with a high quality and ending with a low quality, the relative quality corresponding to a temperature of about 2100° F. while the average temperature is approximately 2400° F. According to my process the temperature will remain constant—hence, I produce a high quality gas always uniform in composition. In this connection, I prefer to maintain the reaction zone at a temperature of say 2400° F., producing constantly a gas quality corresponding to this temperature. The refractories are thus subjected to no higher temperature than that corresponding to the average quality of the gas produced, and neither are they subjected to a wide variation in temperature, as in the water gas process.

Since water gas is essentially the result of the reaction—$C + H_2O = CO + H_2$, it follows that since all of the oxygen for the oxidation of the carbon must be supplied by the decomposition of water vapor, the maximum possible volumetric ratio of carbon monoxide to hydrogen is fixed at 1. Of the two constituents, hydrogen is the least desirable, as it has a lower net heating value and burns with a short intense flame, which is undesirable, particularly for furnace work.

In the manufacture of gas by my process, additional oxygen is supplied so that additional carbon monoxide is formed independently of the hydrogen formation. In other words, I increase the content of carbon monoxide in water gas by using oxygen as well as steam for the blast, thereby obtaining a gas of higher calorific value and one more suitable for general combustion.

As is true in all fuel beds, the bed of fuel in a gas producer cannot be maintained uniform, and as the reactions occur, the fuel changes in volume and the volume change results in the formation of blow holes and fissures. The local increase in flow of gas through these openings results in more rapid local combustion and in higher temperatures. The gas passing through these openings does not receive the intimate contact with the active material necessary, and, hence, is of poor quality. It may be said, therefore, that over a given cross section the gas will vary in composition from point to point, and that under the best operating conditions there is always some local production of poor quality gas which lowers the quality of the mixture.

According to my process, these difficulties are overcome and the combustion proceeds at a uniform rate and temperature, irrespective of change in the volume of fuel, producing practically a uniform grade of gas over the entire section.

In the present practice the only factor which tends to equalize the temperature over a given cross section is the transfer of heat by conduction through the solid fuel. Carbonaceous fuel being a very poor conductor of heat, the effect is small, and the temperature over any cross section is very uneven. According to my process I am not dependent on heat flow through a very poor conductor for temperatures equalization, but on the transfer of heat by radiation. The transfer of heat by conduction is proportional to the temperature difference between two points, while the transfer of heat by radiation is proportional to the difference of the fourth powers of the absolute temperature. It is apparent, therefore, that the effectiveness of temperature equalization over a plane in my process is greater than the same factor in the present process to the extent of the fourth power.

Since the nature of the decomposition by heat of the hydrocarbons contained in coal depends, to a great extent, upon the temperature at which the heat is supplied, the time to which the hydrocarbon is exposed to the heat and to the nature of the surrounding atmosphere, the most efficient operation requires that these conditions be under more or less direct control. For reasons previously explained, this control cannot be had in existing processes, whereas, in my process, I am enabled to maintain constant conditions in the various zones. Further, by the regulation of the relative amounts and velocities of the materials, I am enabled to change quickly the dimensions of the various zones in order to gasify the fuel under the best possible condition.

With respect to the control of the dimensions and temperatures of the various zones, my process has the following advantage.

Below certain minimum temperatures the formation of hydrogen by the action of steam and carbon is accompanied by the formation of carbon dioxide as well as carbon monoxide, the ratio of carbon monoxide to carbon dioxide being apparently at these low temperatures a function of temperature and time of exposure. In this range a comparatively small change in temperature is accompanied by considerable change in the carbon monoxide : carbon dioxide ratio. By my process I am enabled to produce a gas with an appreciable but constant content of carbon dioxide which it is difficult, if not impossible, to do in the present processes. This is made possible in my process by the very close temperature control which may be had and by regulation of which I may increase the carbon dioxide content and hold a steady composition over a given period. This capability enables me to increase the hydrogen content in the finished gas by making a gas high in carbon dioxide and then removing the latter through any suitable means, leaving a mixture of hydrogen and carbon monoxide in which the hydrogen may predominate.

The capability for close temperature control enables me to make a gas suitable for the manufacture of methanol in which the ratio of hydrogen to carbon monoxide is about two to one. To accomplish this I operate the producer with steam and oxygen at a low temperature so that through the formation of carbon dioxide the volume of hydrogen is twice the volume of the carbon monoxide. The gaseous mixture is passed through a suitable absorption system for the removal of the carbon dioxide after which it is of the right chemical composition for conversion to methanol.

If desired, the producer may be operated at a somewhat higher temperature, producing a gas higher in carbon monoxide which I pass over a nickel or iron catalyst, which latter will cause any undecomposed steam accompanying the gas or any steam admitted at this point, to oxidize a part of the carbon monoxide, producing carbon dioxide and hydrogen. If I employ the hot gas as it leaves the producer, the heat content will be sufficient to carry on the mentioned reaction.

By my process I am enabled to insert thermocouples at any desired point because of the uniformity of temperatures obtaining in any plane. This makes it possible to automatically regulate the supply of oxygen and steam, as hereinbefore pointed out.

The fact that I am enabled to avoid the clinker formation which is so objectionable in present practice enables me to obviate the difficulty encountered in present practice, where to avoid clinker formation, the maximum temperature for smooth operation is below the minimum temperature required for the substantially complete conversion of carbon monoxide producing in inferior gas. In my process the maximum temperature is limited only by the nature of the refractories used to line the shaft.

Since the manufacture of water gas consists essentially of the formation of carbon monoxide and hydrogen from carbon and steam, the capacity of any unit is determined by the rate at which reaction can proceed. With temperature and pressure constant, the rate is dependent upon the extent of the surface exposed to reaction. In my process the surface to volume ratio of the fuel is great, and I am enabled to accomplish nearly complete decomposition of the steam so that practically all of the heat expended is converted into calorific energy in the gas. Since the reaction ratio is so greatly increased, the gas making capacity of the process per unit volume of producer is many times that of the present processes.

In a gas producer the amount of volume occupied by gas is equal to the volume of the producer less the volume of the fuel, from which it follows, in present practice, that the relative volumes of gas space and fuel space depend on the size of the fuel, on the change in dimensions of the fuel as it passes through the various zones, and on the manner in which the various shapes and sizes of fuel pieces become placed in the column. It may be said, therefore, that since the operator cannot control the relative positions at which the individual pieces of fuel come to rest or the change or shape which they undergo in heating, that he cannot control this very important volume relation.

In my process I have absolute control over the volume ratio of gas and fuel which I can change at will by changing the rate of charging coal or supplying blast.

Furthermore, in my process I have a large ratio of gas to fuel volume, i. e., there is considerable area in any cross section for the flow of gas. The result of this is that with a given flow of blast, the linear velocity through the producer is much less than is the case where a bed of solid fuel is used. Conversely, for a given size of producer, much more blast may be used in my process than where a solid bed of fuel is employed. This is a factor which affords me great production per unit of producer volume, as also does the continuous character of the process.

My process also eliminates much of the care and expense incident to the selection of fuel, etc., in present practice, for I can use any coal and do not need to screen it, and I may use slack coal or coke breeze as effectively, if not more so, than the most carefully screened lump coal, the fusion temperature of the ash and the softening temperature of the coal being of no concern in my process.

The product of my process being relatively high in heating value, much less oil would be required for carburetting where carburetting is desirable.

It will, of course, be apparent that the process of my invention is particularly adapted for practice in which the quantity of gas desired fluctuates and passes through peaks and periods over which no gas is needed. In present practice peaks in production are obtained by forcing the producer at the expense of gas quality, and when no gas is needed, the producer is banked and any distillation gas formed, wasted. Relatively, my process is very flexible, and I can stop and start operations with ease, losing no appreciable quantity of fuel in either step. Peak loads can be met by changing the number of units operating.

Specifically considering the mechanism of Fig. 1, the fuel such as coal or coke to be gasified is pulverized in the mill 20 operated by the motor 21, such fuel as is reduced to sufficient fineness being lifted by a current of air through the pipe 22 to the separator 23 where the air is unloaded, the unloaded air returning to the mill through the pipe 24 and the separated fuel entering the hopper 25 from which it is fed by a screw conveyor 26 to one or more delivery pipes 27. The screw conveyor is operated by the motor 28.

An air lift mill and air separation are to be preferred as this will result in all of the fuel particles delivered to the hopper 25 having sufficient buoyancy to float down through the producer.

The screw conveyor or other form of feeder employed is operated at variable speed to correspond to the rate of gas production desired. While the rate of feed may be changed, it should always be controlled so as to obtain a reaction zone of the proper dimensions. I prefer that the motor 28 shall be a constant speed motor and that a variable drive, 28a, be employed to secure a variable speed of the feed screw.

The pulverized coal, as it leaves the feed pipes 27, encounters the gas which has been cooled to a moderate temperature by heating and distilling the previously admitted fuel, in consequence of which the hydrocarbons are distilled off with very little cracking, thereby enriching the gas. The small size of fuel particles with correspondingly large surface to volume ratio secures practically uniform distillation, and the products are heated practically no higher than the temperature of distillation.

The gradual enlargement 29 at the upper end of the retort reduces the velocity of the enriched gas without production of objectionable eddying, whereby a small amount of carbon is carried by the gas to the discharge pipe 30. To further ensure the result, I prefer to provide a cone-shaped or cyclone separator member 31 in the top of the shaft into which the feed pipe discharges above the bottom thereof. The rising gas passes upwardly around the cone and enters thereinto through the ports 32 from which it flows to the pipe 30 as indicated by the arrows. The entering gas is caused to whirl or spiral in the separator whereby any particles carried in the gas are separated.

After passing through the distillation zone in the upper part of the retort, the coal reaches the reaction zone as coke containing some ash. Due to the arrangement of the nozzles 9 some swirling occurs, so that the falling fuel particles are thoroughly mixed with the ascending gas, giving uniform distribution and eliminating dead spaces.

The counter-current of fuel and gas heats the fuel by cooling the gas, so that the latter carries but little sensible heat from the retort, while the former reaches the reaction zone practically at the temperature of reaction. In the reaction zone the oxygen and steam react with the carbon in the coke to form carbon monoxide and hydrogen, as before described.

To assist in ensuring proper mixture and elimination of dead spaces, I prefer to introduce the steam through the nozzles 15 to produce a swirling movement opposite to that produced by the nozzles 9.

To start the retort when cold, the blast valve 16 is closed and the retort is filled with inert nitrogen through the feed pipe 33.

The pulverized fuel is now fed to the retort, but, since the latter is filled with an inert gas, no explosion can result. Over each of the oxygen nozzles 9 is inserted a loop of iron wire, as indicated at 34, and when the switch 35 is closed, the wire is heated to a red heat. The hot wire, however, will not burn nor ignite the coal in the inert atmosphere of nitrogen, and to secure ignition oxygen is now fed at a low rate by opening the valve 16. This immediately produces combustion of the pulverized fuel due to the elevated temperature caused by the heating coil of iron wire. The latter will burn thereby disrupting the electrical circuit, as will be indicated on the ammeter 36.

When the desired operating temperature is approached steam may be also fed through the nozzles 15. The temperature measuring device 19 will indicate the temperature in the reaction zone by the instrument 37, and where the automatic control hereinbefore described is employed, the flow of steam will be regulated to maintain substantial constancy in operating temperature.

As the oxygen is only supplied at a low rate, unburned fuel will be found in the ash, and the supply of oxygen may be increased until the unburned carbon becomes very small, after which thhe oxygen supply may be manually controlled to maintain these conditions.

The automatic control of the oxygen supplied depends upon the following: If too much oxygen is being admitted, the reaction zone will extend upwardly, causing an increase in temperature immediately above the normal position of the reaction zone, and the temperature measuring device 17 will rise in temperature, which will be indicated on the instrument 38 associated with the automatic regulating valve, which will operate to reduce the supply of oxygen. Vice versa, if insufficient oxygen is being supplied, the temperature of the device 17 will fall, which, in turn, will affect the instrument 38 and the regulating valve to increase the oxygen supply.

When the gas leaving the retort is of the proper quality, the main valve 39 is opened, and the vent valve 39a closes, and operations are continued as long as desired. In case of any short shut down, the retort will remain sufficiently hot to start the desired reactions upon starting the feeding of the fuel.

Furthermore, control may be had by setting the manual control valves for minimum flows, reliance being had upon the automatic control devices B and C to increase the flows as may be required.

With the producer operating below a temperature which is safe for the refractory lining but high enough to produce a gas nearly free of carbon dioxide, the gas would ordinarily be composed of carbon monoxide and hydrogen, together with the volatile material distilled from the coal before it reaches the reaction zone. While these volatile constituents enrich the gas and raise its heating value, the heating and illuminating proportions might not meet some legal requirements. Instead of enriching the gas after leaving the producer by the products of cracking a light petroleum oil in a heated checkerwork retort, I propose to introduce the petroleum or other gas oil directly into the producer as through the bustle pipe 40 provided with discharge pipes 41. The point of introduction is at a place where the temperatures will crack the oil into vapor more or less permanent in the gas at room temperature. If the oil were introduced into the gas after the temperature had dropped too low, the oil would simply be vaporized and would then condense in the gas mains. If the oil were introduced into the producer too near the reaction zone a large proportion would be broken down into hydrogen and carbon monoxide which would not enrich the gas. Either the desired enrichment would not be attained or an excessive amount of oil would be required. Therefore, the oil gas is sprayed into the producer at a point where the temperature is such as to crack the oil just to the desired degree. By means of a recording calorimeter on the gas outlet the admission of oil can be controlled to keep the heating value of the gas at or above the legal requirements.

Referring to the process generally, the gas, in passing up through the producer from cooler to cooler zones, finally reaches the point where some of the tars distilled from the coal may condense on the refractory walls. This tar would ordinarily run down, be cracked by the higher temperatures encountered, and form coke to the detriment of the operation of the producer. The cooling effect of the walls is minimized by the use of insulating brick between the inner firebrick lining and the shell. Above the height where the insulation would not be affected, it may be omitted, and to prevent the liquid tar condensed on the walls above this point from flowing down to a level where coke would be formed, the trough 42 is provided for catching the tar and from which it is drained to the exterior.

The process may also be used in association with a predistillation process, as, for example, where powdered coal is distilled in a retort. The product of this distillation would be powdered coke, and this powdered coke is discharged through feed pipes into the gasification retort, after which the operation would be substantially as described. Similarly, if the fuel is of such character as to give operating troubles from "stickiness", it can be preliminarily treated in a retort by subjecting it to the required amount of heat to obviate the stickiness in an oxidizing atmosphere, the end product of such retort being then fed through the pipes 27. In either case the heating medium of the preliminary retort may be part or all of the gas produced in the gasification retort. If the sensible heat of such gas is not sufficient for the reactions of the preliminary retort, the gas may be in whole or in part burned with air or oxygen previous to admission into the preliminary retort.

The controls thus far described essentially relate to regular operation rather than to emergency conditions. It is true that by providing the controls such as the control device B with a number of contact points, emergency control may be had, as, for example, if the temperatures in the reaction zone became very low by reason of failure of the pulverized fuel supply, the motor operated by-pass valve 16a controlling the supply of oxygen would be closed. Similarly, if the temperature exceeds a predetermined value, the blast supply will be cut off. I prefer, however, to provide additional emergency control mechanism which will now be described.

At the high operating temperatures encountered above 2000° F., thermo-couples of platinum and platinum and rhodium are the most suitable means of temperature measurement and control. These thermo-couples produce electrical currents of sufficient strength to operate the indicating and recording instruments, but too feeble to operate a motor driven valve. Hence, a control circuit, preferably electrical, should be provided to operate the valve when the indicating instrument is actuated by a thermo-couple. Should the electrical current supply to the control circuit fail, however, the automatic control becomes inoperative. While the supply of oxygen and steam could still be manually controlled according to the temperature indexes, means are provided for automatically shutting off the supply of oxygen and steam when such failure occurs. In the oxygen and steam supply pipes valves 43 and 44 are provided, the valves being held open by solenoids when energized. Upon failure of the electric current these valves will close.

The control circuit is extended to the valve 39 in the gas outlet and to a circuit breaker D in the electrical line to the motor 28 which drives the fuel feeder. Hence, if the electrical current for automatic temperature control fails, the supply of fuel, oxygen and steam will all be cut off and the gas outlet will be closed. If a gas exhauster be employed the control circuit could also be extended to the motor driving the exhauster so as to shut down such exhauster in this contingency.

Any break in the control circuit passing through the solenoid operated valves would have the same effect and advantage has been taken of this fact to provide additional emergency controls. Thus, a pressure operated device 45 in the steam supply pipe makes a contact which, if broken by reason of the failure of the steam supply, shuts off the oxygen supply, etc. A solenoid operated switch 46 is located between the motor driving the fuel feeder and the starting switch and remains closed as long as the motor is in operation. When the fuel feeding device is stopped by cutting off the current supply to its driving motor, the supply of oxygen, etc., is also cut off.

A more direct emergency control for shutting off the oxygen supply when the feed of pulverized fuel is interrupted is provided by the selenium cell 47 mounted within the producer at such a point that it is ordinarily screened from the white hot reaction zone by the falling fuel. Upon interruption of this falling cloud of fuel, light from the reaction zone strikes the cell and breaks the control circuit, thus shutting off the oxygen supply. Such a cell could also be placed opposite one of the windows 48 in the feed pipe 27. Normally a light 49 is provided so that the operator, through suitable reflectors, may observe the fuel being fed through the pipes 27. By placing the selenium cell opposite the light 49, it would be normally shielded by the fuel. Upon stoppage of fuel feed, however, the light would become effective to operate the cell.

In the arrangement of Figs. 2, 3 and 4, I have shown a combined gasifying retort and steam generator. The generator comprises tubes 50 lining the refractory walls of the retort in the reaction zone, such tubes being suitably connected for circulation with steam and water drums 51. Such tubes may be employed merely for the protection of the refractories by the useful abstraction of heat. However, they may be employed to still greater advantage.

As explained, the reaction $2C+O_2=2CO$ is exothermic and it was heretofore proposed to balance this heating effect by the endothermic reaction $C+H_2O=CO+H_2$. By the use of "water cooled" walls, the heat produced by the first mentioned chemical reaction is more or less absorbed by the steam generated, so that less steam is required for the second chemical reaction.

In fact, it is possible so to proportion the producer that the water cooled wall area exposed to radiation will be just sufficient to absorb the quantity of heat which will keep the temperature of reaction down to the desired operating value. This operating temperature will also depend upon the capacity at which a given size of producer is operated, however, the higher the operating capacity, the higher the operating temperature. The operating temperature determines the carbon monoxide: carbon dioxide ratio. Hence, to secure a gas composed almost entirely of carbon monoxide, the water cooled surface must have an area sufficient to absorb the heat of reaction of carbon with oxygen to form carbon monoxide within the desired operating temperature range and the producer must be operated within the capacity range which will produce the said heat of reaction. In this connection, it is to be understood that a portion of the heat of reaction may be carried out of the producer by other means than the water cooled walls.

In the above method of operation, it is assumed that no steam is intentionally supplied to absorb heat by its chemical reaction with carbon. Some moisture may be in the oxygen or oxygenated air supplied, and some water may be evaporated from the water filled ash pan. These, however, are not directly under control and are small, particularly when a "water screen" is employed to protect the ash pan from radiant heat from the reaction zone.

The producer might be designed purposely with the water cooled walls of less area than would be sufficient to absorb the heat of chemical reaction with oxygen. Then a relatively small amount of steam could be supplied to control the reaction temperature and the corresponding gas quality. This would also maintain nearly constant the amount of steam generated in the water cooled walls irrespective of the rate of gas generation. That is, at a certain minimum rate of gas generation, the heat produced by the carbon-oxygen reaction would be only sufficient to supply that radiated to the water cooled walls at the desired reaction temperature. As the rate of gas generation is increased above this minimum value, more and more steam must be supplied to keep the reaction temperature down to the value. If the reaction temperature is maintained constant, the heat radiated and consequently the steam generated will be kept nearly constant.

While at first sight this combination of gas producer and steam generator would appear to be difficult of control, yet the above analysis shows that means may be provided to control either the rate of gas production or the rate of steam generation. Thus, by varying the rate of pulverized fuel feed and the corresponding rates of oxygen and steam supply so as to maintain the reaction temperature constant, the gas production will vary while the steam generation remains substantially constant. On the other hand, the steam generation may be varied by varying the reaction temperature by changing the rate of steam supply, the gas quantity and quality being affected somewhat, but it may be brought back to substantially the original condition by varying the fuel feed, etc. The same general scheme of automatic control may be employed with "water cooled" walls as without such walls.

In any case, the gas produced is very rich in carbon monoxide compared to any other industrial gas and has correspondingly valuable properties.

In addition, superheating tubes 52 may be employed above the steam generating tubes, and, if desired, screen tubes 53 may be provided below the reaction zone to cool the gravitating refuse particles; and other arrangements may be provided for usefully abstracting heat for the purpose hereinbefore stated.

The tubes 9 for delivering the oxygen blast from the bustle pipe are preferably composed of a refractory material such as the fused aluminum oxide alundum, and they extend from a point of high temperature to a point of low temperature where they are coupled to the bustle pipe. Thus, oxygen will only be in contact with metal where the temperatures are moderate.

Instead of introducing steam, as hereinbefore described, $CO_2$, or a gas containing $CO_2$, such as blast furnace gas, may be admitted in place thereof.

I claim:—

A process of making combustible gas: which comprises regulably admitting finely divided coal into the top of a gas generating chamber of a gas producer, admitting oxygen to an intermediate portion of the gas generating chamber, admitting steam at the bottom portion of the gas generating chamber, admitting oil at the upper portion of the gas generating chamber to enrich the generated gas, and automatically controlling the admission of the oxygen and steam by the temperature in the gasification zone in the gas generating chamber.

In testimony whereof I have hereunto signed my name.

WILLIAM L. DE BAUFRE.